Feb. 9, 1932. O. L. POSEY 1,844,229
LAND SCRAPER
Filed April 25, 1931 2 Sheets-Sheet 1
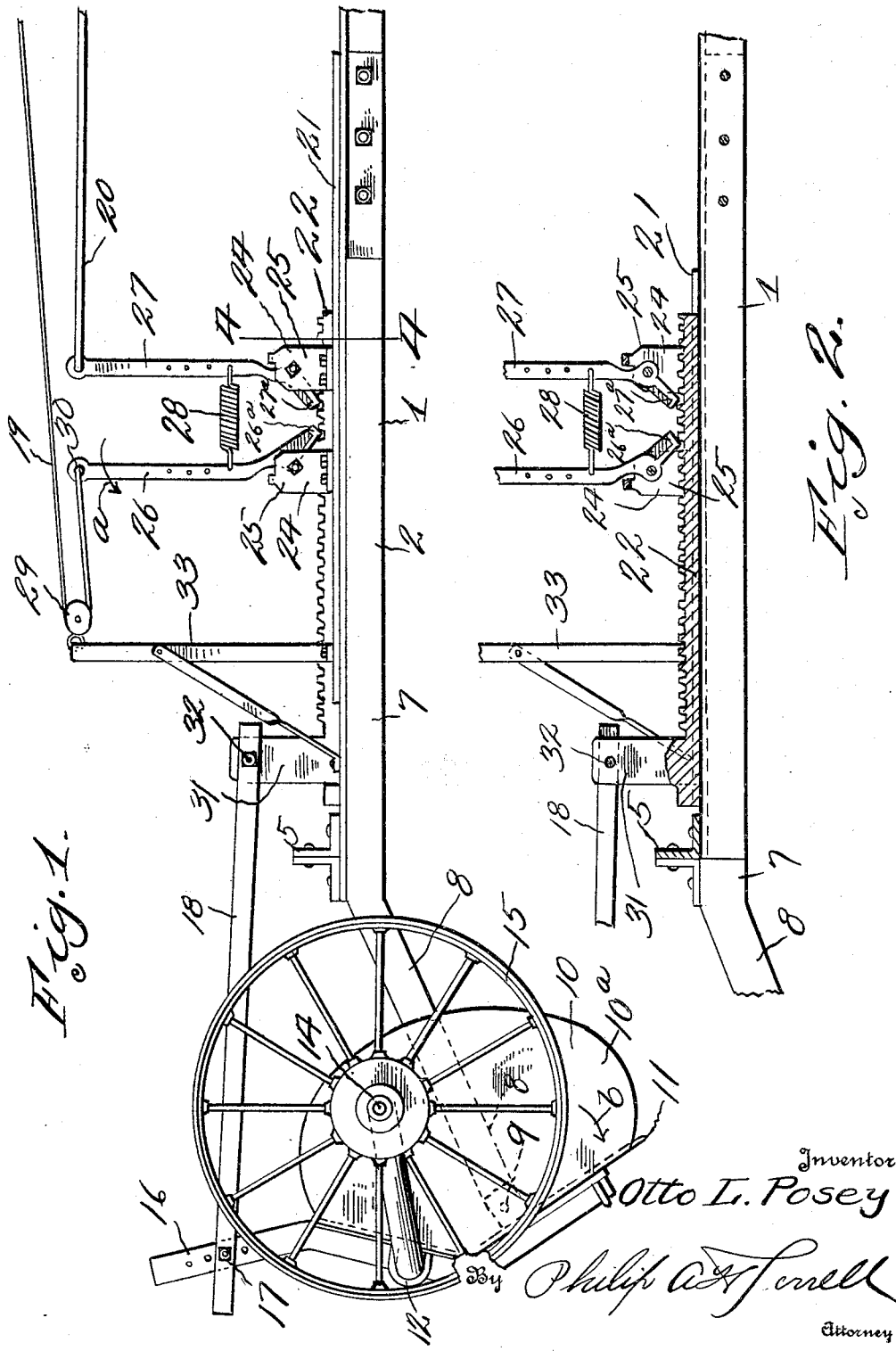

Feb. 9, 1932.  O. L. POSEY  1,844,229
LAND SCRAPER
Filed April 25, 1931    2 Sheets-Sheet 2
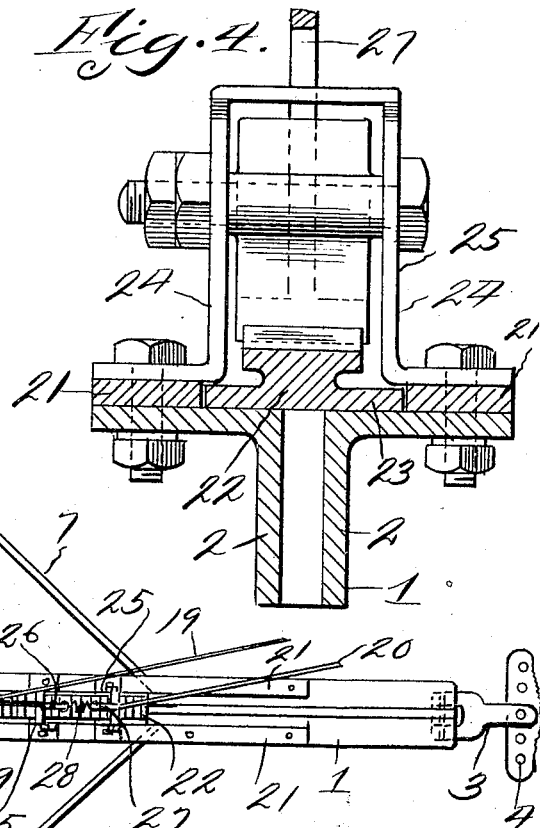
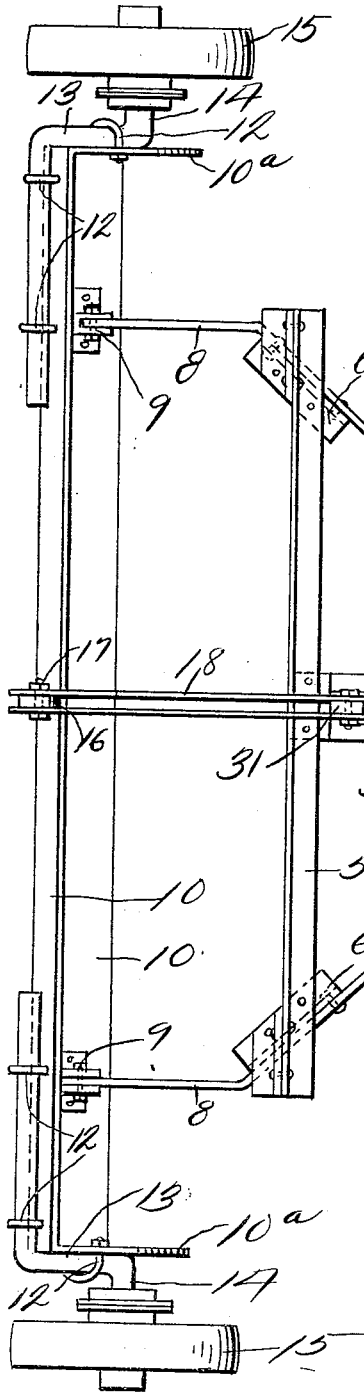
Inventor
Otto L. Posey
By Philip A. Terrell
Attorney Patented Feb. 9, 1932

1,844,229

UNITED STATES PATENT OFFICE

OTTO L. POSEY, OF SOMERTON, ARIZONA

LAND SCRAPER

Application filed April 25, 1931. Serial No. 532,931.

The invention relates to land scrapers, and has for its object to provide a device of this character comprising a frame, the forward end of which may be attached to a tractor and with a pivoted scraping element, wheel supported at the rear end of the frame, and means slidably mounted on the frame for controlling the upward and downward movement of the scraping element for regulating the depth of the scraping operation.

A further object is to provide a longitudinally movable rack bar on the scraper frame, one end of which has a link connection with an upwardly extending arm of the pivoted scraping element and spring actuated detents cooperating with said rack bar for holding the same against longitudinal movement in either direction until manually released.

A further object is to provide cable means cooperating with the spring actuated detents whereby said rack bar may be allowed to move rearwardly for allowing a downward movement by gravity of the scraping element for the desired depth of scraping, and for allowing a forward movement of the rack bar when it is desired to dump the scoop.

A further object is to provide the rear end of the frame with downwardly diverging arms, the rear ends of which are pivotally connected to the scoop at opposite sides thereof, wheels supporting opposite sides of the scoop having their centers axially disposed and forwardly of the pivotal point of the scoop, whereby upon extreme movement of the scoop to a dumping position, said wheels will come into engagement with the ground as the scoop assumes an inverted dumping position.

A further object is to provide the scoop with an upwardly extending arm having a link connection with an upwardly extending arm carried by the slidable rack whereby when said rack is allowed to move in either direction upon release of its detent means, the scoop may pivotally move according to the direction of movement of the rack.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the scraping machine.

Figure 2 is a vertical longitudinal sectional view through the scraping machine.

Figure 3 is a top plan view.

Figure 4 is a vertical transverse sectional view taken on line 4—4 of Figure 1.

Referring to the drawings, the numeral 1 designates the frame of the scraper, which is preferably formed from angle bars 2, to the forward end of which is connected a conventional form of clevis 3, adapted to be connected to a draw bar 4 of a conventional form of tractor, not shown. Extending transversely of the frame 1 at its rear end is an angle bar 5, to the ends of which are connected by means of angle bars 6, the diverging brace members 7. Brace members 7 terminate in rearwardly and downwardly extending arms 8, which are pivotally connected at 9 to the inner side of the scraper scoop 10. It will be noted that the scoop 10 is pivotally movable vertically so that its scraper edge 11 may be lowered by gravity for increasing the depth of the scraping operation or raised for limiting the depth of the scraping operation, or rearwardly raised for the dumping operation. Secured by means of U-bolts 12 to the scraper 10 are angle members 13, which terminate in outwardly extending arms 14, on which ground engaging wheels 15 are rotatably mounted. It will be noted that the ground engaging wheels 15 are forwardly mounted in relation to the pivotal points 9, therefore it will be seen that as the scraper moves forwardly with the scraping member 10 free to move by gravity under the weight of its side members 10a, and the ground engaging wheels 15, the scraper will swing downwardly.

Secured to the rear side of the scraper 10 and extending upwardly therefrom is an arm 16, to the upper end of which is pivotally connected on a bolt 17 a forwardly extending link 18, which link is adapted to be moved forwardly and backwardly for the pivotal action, for instance for adjusting the scraper for the proper depth of cut, and for allowing a rearward pivotal movement of the lower end of the scraper for a dumping operation, and at which time the ground engaging wheels come into engagement with the ground for allowing a clean dumping of the load from the scoop and the passage of the scoop over the dumped load.

The present scraper is particularly designed to be attached to a tractor, and as the operator is located on the tractor a remote control is desirable through the medium of cables 19 and 20. Slidably mounted on the frame 1 between guide plates 21 is a rack bar 22. The opposite sides of the rack bar 22 are provided with flanges 23, and overlying said flanges 23 are arms 24 of U-shaped brackets 25. It will be noted that the arms 24 prevent upward displacement of the rack bar, and in combination with the plates 21 and the frame 1, positively guide the rack bar in its longitudinal movement.

Pivotally mounted between the arms 24 of the U-shaped brackets 25 are upwardly extending detent levers 26 and 27, the noses 26a and 27a cooperating with the rack bar 22 in opposed relation whereby when said detent levers are forced together by the contraction of the connecting spring 28, the rack bar is positively held against longitudinal movement, for instance for the scraping operation after an adjustment of the scraping element.

The cable 19 extends rearwardly and through a pulley 29, and thence forwardly and is connected at 30 to the upper end of the lever 26, therefore it will be seen that when a pull is imparted on the cable 19, the upper end of the detent lever 26 will move in the direction of the arrow a, thereby raising the nose 26a thereof and allowing rearward movement of the rack bar 22 to the arm 31 of which the link 18 is connected at 32. Upon rearward movement of the link 18, the scraping edge and scraper may be adjusted upwardly, and it will be seen that as the vehicle advances it will be necessary for the rack bar to move forwardly for allowing downward movement of the scraper by gravity until the proper depth of cut is reached, and at which time the operator releases the detent lever 27, which will prevent further forward movement of the rack bar 22. During the forward movement of the rack bar 22, its teeth cam over the nose 26a of the detent lever 26, therefore it will be seen that when both detent levers are released said rack bar is positively held against longitudinal movement in either direction, therefore it will be seen that the scraper will be held at the desired scraping depth.

When it is desired to dump the scraper upon continued forward movement of the machine, the operator imparts a pull on the cable 20, thereby releasing the detent lever 27 and the rack bar. As the vehicle continues the forward movement with the scraping edge 11 embedded in the ground, the scoop 10 will pivotally move on its pivot point 9 in the direction of the arrow b until the ground engaging wheels 15 come into engagement with the ground. This action continues until the scoop is in inverted position and will pass forwardly over the discharged load. The scoop may be reset by a backing operation and manipulation of levers 26 and 27.

From the above it will be seen that a control mechanism is provided for wheel supported scrapers whereby the scraping element can be controlled from a distance, for instance from a towing vehicle. It will also be seen that the control mechanism is simple in construction, the parts reduced to a minimum and provided with means whereby the same may be remotely controlled.

The pulley 29 is carried by the upper end of a stationary bracket 33 mounted on the frame 1 rearwardly of the detent lever 26, so that when a pull is imparted on the cable 29, detent lever 26 will move out of cooperative engagement with the slidable rack bar 22.

The invention having been set forth what is claimed as new and useful is:—

1. A scraper comprising a frame, a scraper scoop pivotally mounted on the rear end of the frame, ground engaging wheels carried by the opposite sides of the scoop forwardly of its pivotal axis, a rack bar slidably mounted on the frame, a link connection between the rack bar and the scoop above the pivotal axis of the scoop, detent levers cooperating with the rack bar, said levers being in opposed relation for positively holding the rack bar against movement in either direction, spring means for normally maintaining the detent levers in cooperative engagement with the rack bar and means cooperating with said levers whereby they can be selectively moved out of cooperative engagement with the rack bar.

2. A scraper comprising a frame, downwardly diverging arms carried by the rear end of the frame, a scraper scoop pivoted to said arms, wheels carried by said scoop at its ends forwardly of the pivotal axis of the scoop, a rack bar slidably mounted on the frame, a link connection between the rack bar and the scoop above the pivotal axis of the scoop, brackets carried by the frame adjacent the rack bar, detent levers pivoted in said brackets, noses carried by said detent levers and engaging the rack bar in opposed relation and holding the rack bar against movement in either direction, a contractible spring connecting said levers above their pivot points and cables cooperating with said levers for controlling the same.

3. The combination with a scraper comprising a pivoted scraping member, a frame, said scraper being hingedly connected to the rear end of said frame, of means permitting rocking of said scraping element, said means comprising a slidable rack, a link connection between the scraper and slidable rack, opposed pivoted detent levers cooperating with the rack and means for selectively controlling the movement of the levers.

4. The combination with a scraper comprising a frame, a scraper scoop hingedly connected to the rear end of the frame, said scoop having wheels connected to the opposite ends thereof and adapted to be moved into engagement with the ground upon forward movement of the frame when the scoop is free to move, of means for controlling said scoop, said means comprising a rack bar slidably mounted on the frame, a link connection between the rack bar and the scoop, brackets mounted on the frame adjacent the rack bar, levers hingedly mounted on said brackets in opposed positions and engaging the rack bar in opposed positions, spring means for normally forcing said rack bar levers into engagement with the teeth of the rack bar and cable means cooperating with said levers whereby they may be simultaneously or selectively moved for holding or releasing the rack bar.

5. The combination with a pivoted scraper scoop controlled by a slidable rack bar mounted on a scraper frame, of means for holding said scraper in various positions after its movement by engagement with the ground during the movement of the scraper frame, said holding means comprising brackets arching the rack bar, levers pivoted in said brackets, downwardly and inwardly extending opposed noses carried by said levers and engaging the teeth of the bar and positively holding said bar against longitudinal movement in either direction, a contractible spring connecting said levers above their pivotal points and means for simultaneously or selectively controlling the cooperation of the noses of the levers with the bar.

6. The combination with a scraper comprising a pivoted scraping member, a frame, said scraping member being mounted on said frame, of means permitting rocking of said scraping element, said means comprising a slidable rack, a connection between the scraper and the rack, opposed detent members cooperating with the rack and means for selectively controlling the movement of the detent members.

In testimony whereof he hereunto affixes his signature.

OTTO L. POSEY.